(12) United States Patent
Nishimoto et al.

(10) Patent No.: US 7,954,471 B2
(45) Date of Patent: Jun. 7, 2011

(54) SPARK IGNITED INTERNAL COMBUSTION ENGINE AND MANUFACTURING THE SAME

(75) Inventors: Toshiaki Nishimoto, Hiroshima (JP); Naoya Watanabe, Higashihiroshima (JP); Kazuhiro Nagatsu, Hiroshima (JP); Masatoshi Hidaka, Higashihiroshima (JP); Hiroaki Abe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 12/497,314

(22) Filed: Jul. 2, 2009

(65) Prior Publication Data

US 2010/0000493 A1 Jan. 7, 2010

(30) Foreign Application Priority Data

Jul. 7, 2008 (JP) ................................ 2008-176787
Jul. 7, 2008 (JP) ................................ 2008-176790

(51) Int. Cl.
*F02B 19/00* (2006.01)
*F02B 5/00* (2006.01)
*F02F 3/26* (2006.01)

(52) U.S. Cl. .......................... 123/261; 123/279; 123/305

(58) Field of Classification Search .................. 123/256, 123/260, 261, 276, 279, 281–282, 285, 298, 123/305, 307, 661, 151, 193.4, 193.6, 197.2
See application file for complete search history.

(56) References Cited

U.S. PATENT DOCUMENTS

| | | | | |
|---|---|---|---|---|
| 2,810,377 A * | 10/1957 | Weissenbach | ................ | 123/661 |
| 4,522,172 A * | 6/1985 | Oshima et al. | ................ | 123/276 |
| 4,532,898 A * | 8/1985 | Hayakawa et al. | ........... | 123/276 |
| 4,676,208 A * | 6/1987 | Moser et al. | ................... | 123/276 |
| 5,645,028 A * | 7/1997 | Matsuoka et al. | ............. | 123/276 |
| 5,806,482 A * | 9/1998 | Igarashi et al. | ................ | 123/259 |
| 6,138,639 A * | 10/2000 | Hiraya et al. | ................. | 123/295 |
| 6,161,518 A * | 12/2000 | Nakakita et al. | .............. | 123/298 |
| 6,588,396 B1 * | 7/2003 | Cleary et al. | .................. | 123/276 |
| 6,640,772 B2 * | 11/2003 | Gatellier et al. | .............. | 123/298 |
| 6,672,277 B2 * | 1/2004 | Yasuoka et al. | ............... | 123/295 |
| 6,675,767 B2 * | 1/2004 | Gatellier et al. | .............. | 123/298 |
| 6,691,670 B1 * | 2/2004 | Gatellier et al. | .............. | 123/298 |
| 6,705,279 B2 * | 3/2004 | Iriya | ............................. | 123/301 |
| 6,892,695 B2 * | 5/2005 | Schmitz et al. | ............... | 123/295 |

(Continued)

FOREIGN PATENT DOCUMENTS

JP 2007154827 6/2007

*Primary Examiner* — Stephen K Cronin
*Assistant Examiner* — Johnny H Hoang
(74) *Attorney, Agent, or Firm* — Alleman Hall McCoy Russell & Tuttle LLP

(57) ABSTRACT

There is provided a spark ignited internal combustion engine having a geometric compression ratio of 13.0 or greater. The engine comprises combustion chambers having a cylinder stroke volume of 0.3 liter or greater, with the spark plug in the chamber ceiling having its spark point in the combustion chamber, and a cavity being formed on the top surface of the piston. At least part of the cavity defines a spherical surface that a hypothetical sphere having its center at the spark point contacts when the piston is at top dead center. The cavity is formed so that $V2/V1 \geq 0.31$, where V1 is top-dead-center combustion chamber volume, and V2 is the volume of the part of the hypothetical sphere not interfering with the combustion chamber floor or ceiling at top dead center. The flame thus spreads with less interference, shortening combustion duration and reducing fuel consumption.

21 Claims, 7 Drawing Sheets

U.S. PATENT DOCUMENTS

| | | | |
|---|---|---|---|
| 6,997,158 B1* | 2/2006 | Liu | 123/279 |
| 7,040,279 B2* | 5/2006 | Regueiro | 123/254 |
| 7,077,106 B2* | 7/2006 | Ichise et al. | 123/429 |
| 7,341,053 B2* | 3/2008 | Kitada et al. | 123/661 |
| 7,360,531 B2* | 4/2008 | Yohso et al. | 123/657 |
| 7,650,872 B2* | 1/2010 | Nishimoto et al. | 123/279 |

* cited by examiner

SPARK IGNITED INTERNAL COMBUSTION ENGINE AND MANUFACTURING THE SAME

BACKGROUND

The present description relates to a spark ignited internal combustion engine. It relates more specifically to a spark ignited internal combustion engine having relatively high compression ratio and to manufacturing such an engine.

It is known that a greater geometric compression ratio of an engine cylinder improves heat efficiency of an internal combustion engine. The geometric compression ratio is a ratio of a volume of a combustion chamber at bottom dead center during a cylinder cycle to a volume of the combustion chamber at top dead center during the cylinder cycle, and it can be said to be a geometric expansion ratio. Therefore, the greater geometric expansion ratio makes combusted gas in the combustion chamber expand more so that the heat energy can be converted more to mechanical energy output through the crankshaft of the engine.

When a spark ignited internal combustion engine operates, a spark plug ignites air-fuel mixture in a combustion chamber around top dead center of the compression stroke during a cylinder cycle, and then flame of the ignited air-fuel mixture propagates from a spark point of the spark plug through the un-combusted mixture toward a periphery of the combustion chamber. As the flame spreads and the combustion of the air-fuel mixture is completed more quickly, more heat is generated at an earlier stage of the expansion stroke. Then, the engine generates more torque resulting in a higher operating efficiency and lower fuel consumption of the engine.

Theoretically, the flame spreads in a radial direction from the point of the spark plug. The flame contacting a combustion chamber surface such as a piston head may deteriorate the flame propagation and delay the combustion completion or, in other words, a combustion period may be made longer. If the geometric compression ratio is greater, the combustion chamber volume at top dead center is smaller and the flame is more likely to contact to a combustion chamber volume.

One exemplary method to reduce the above described deterioration of the flame propagation is described in Japanese Patent Application Publication No. 2007-154827. A spherical cavity is formed on a piston head which defines a floor of the combustion chamber and is aligned with a spark plug gap when the piston is at top dead center during a cylinder cycle. The spherical cavity can delay a timing of the first contact between the flame and the piston head surface because the spherical cavity has its center coincide with the spark plug gap at the top dead center. Therefore, the combustion period can be shortened. Engine operating efficiency can be improved.

In accordance with the prior art method, a larger spherical cavity is more effective in terms of shortening the combustion period. But, the larger spherical cavity would result in a smaller geometric compression ratio if the cylinder volume were same. It would lead to lower operating efficiency of the engine.

Therefore, there is room to improve design of spark ignited combustion engines with higher compression ratios.

SUMMARY

Accordingly, there is provided, in one aspect of the present description, a spark ignited internal combustion engine having a geometric compression ratio of 13.0 or greater. The spark ignited internal combustion engine comprises a combustion chamber having a side wall formed by a cylinder, a floor formed by a top surface of a piston, and a ceiling, and having a cylinder stroke volume of 0.3 liter or greater, a spark plug arranged on said ceiling and having its spark point located in said combustion chamber, and a cavity formed on the top surface of the piston, at least part of the cavity defining a spherical surface to which a hypothetical sphere having its center at the spark point contacts when the piston is at top dead center during a cylinder cycle. The cavity is formed so that a ratio of V2 to V1 is equal to or greater than 0.31, where V1 is a volume of the combustion chamber when the piston is at top dead center, and V2 is a volume of part of the hypothetical sphere which does not interfere with any one of the floor and ceiling of the combustion chamber when the piston is at top dead center.

In the first aspect, the hypothetical sphere may be considered to be a flame which spreads from the spark point. The cavity is formed so that the hypothetical sphere contacts at least part of its surface when the piston is at top dead center during a cylinder cycle. Therefore, if the cavity is made larger, interference of the flame with the cavity can be delayed. However, at the same time, total volume of the combustion chamber at top dead center is increased, and it is not good for making a compression ratio greater.

In this regard, the inventors herein have unexpectedly discovered that the interference of the flame can be delayed while the higher compression ratio is obtained if a ratio of the volume of the hypothetical sphere to the total volume of the combustion chamber when the piston is at top dead center (ratio of V1 to V2) falls within a certain range. Specifically, the inventors rigorously studied combustion durations and fuel consumption rates of engines which have various volumes of the cavities and have discovered that there is a concrete correlation between combustion duration and a fuel consumption rate as shown in a graph of FIG. 6(a). The graph shows an inflection range between 52 and 55 degrees in crank angle (CA). Therefore, it can be said that the fuel consumption rate can be effectively decreased if the combustion duration is in the inflection range or shorter.

Then, having studied a relationship between the two parameters, it is turned out that there is a correlation between the combustion duration and the ratio of V2 to V1 as shown in a graph of FIG. 6(b). According to the graph, it can be said that to complete combustion in the range between 52 and 55 degrees CA for the reduced fuel consumption rate the ratio of V1 to V2 needs to be a range between 0.31 and 0.35 or greater.

According to the first aspect, the total volume of the combustion chamber is set so that a geometric compression ratio is 13.0 or greater, and the cavity is formed so that the ratio of V2 to V1 is equal to or greater than 0.31. Therefore, the flame may spread with less interference in the combustion chamber to make the combustion duration shorter. As a result, the fuel consumption rate of spark ignited internal combustion engine can be reduced.

However, if the combustion duration is shortened beyond a range of 50 through 52 degrees CA, the fuel consumption rate does not decrease so significantly as it does above the range. Considering that it is harder to achieve a higher compression ratio if the cavity has a greater volume, the ratio of V2 to V1 may not be set excessively great. From the graphs of FIG. 6, it can be said that the ratio is preferably set equal to or less than 0.37.

In a second aspect of the present description, there is provided a method of manufacturing spark ignited internal combustion engines having different single cylinder stroke volumes of 0.3 liters or greater and geometric compression ratios of 13.0 or greater. The spark ignited internal combustion engines comprise a combustion chamber having a side wall formed by a cylinder, a floor formed by a top surface of a piston and a ceiling, a spark plug arranged on the ceiling and having its spark point located in the combustion chamber, and a cavity formed on the top surface of the piston, at least part of the cavity defining a spherical surface to which a hypothetical sphere having its center at the spark point contacts when the piston is at top dead center during a cylinder cycle. The method comprises forming the cavity so that ratios of V2 to V1 fall within a common range for the spark ignited internal combustion engines, where V1 is a volume of the combustion chamber when the piston is at top dead center, and V2 is a volume of part of the hypothetical sphere which does not interfere with any one of the floor and ceiling of the combustion chamber when the piston is at top dead center.

According to the second aspect, the ratios of the volume of the hypothetical sphere to the total volume of the combustion chamber when the piston is at top dead center (ratios of V1 to V2) fall within the common range for the spark ignited internal combustion engines manufactured by the method. Accordingly, the interference of the flame with the cavity can be delayed while achieving higher compression ratios, so that the fuel consumption reduction can be equally achieved, as described above, for the manufactured engines. Therefore, this advantage can be equally attained for engines having different single stroke volumes manufactured by the method. As a result, a development result of one particular engine specification can be utilized for a plurality of engine specifications having different sizes, leading to a reduction of cost for developing different sized engines. Consequently, different sized engines with the improved fuel economy can be manufactured with the reduced development cost.

In an embodiment, the common range of ratio of V2 to V1 may be between 0.31 and 0.37 as described above. Alternatively, the common range may be set so that the upper limit value of the range is 1.2 times or less of the lower limit value.

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

Figure 1:
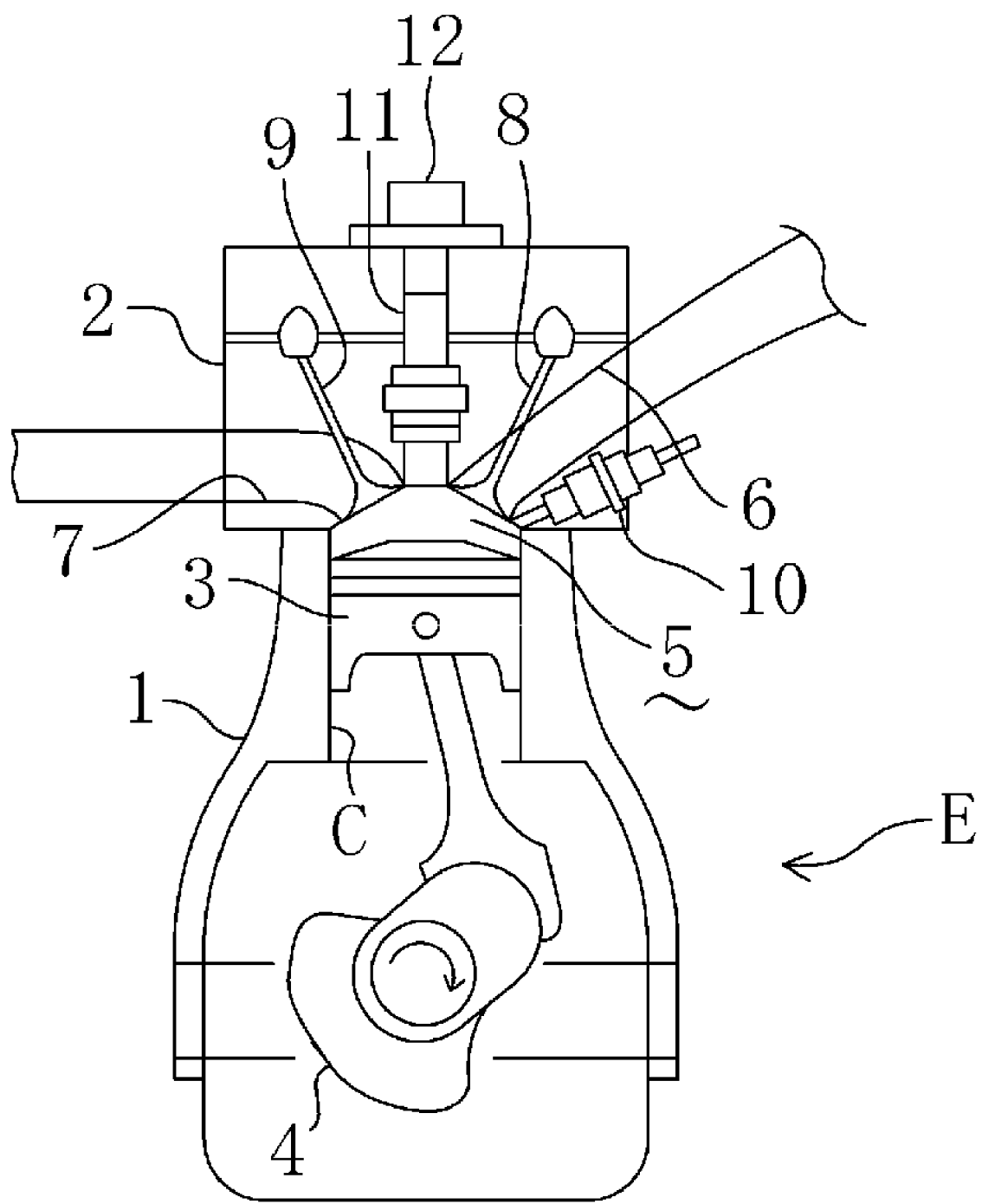
FIG. 1 is a schematic view showing a spark ignition internal combustion engine according to an embodiment of the present description.
Figure 2:
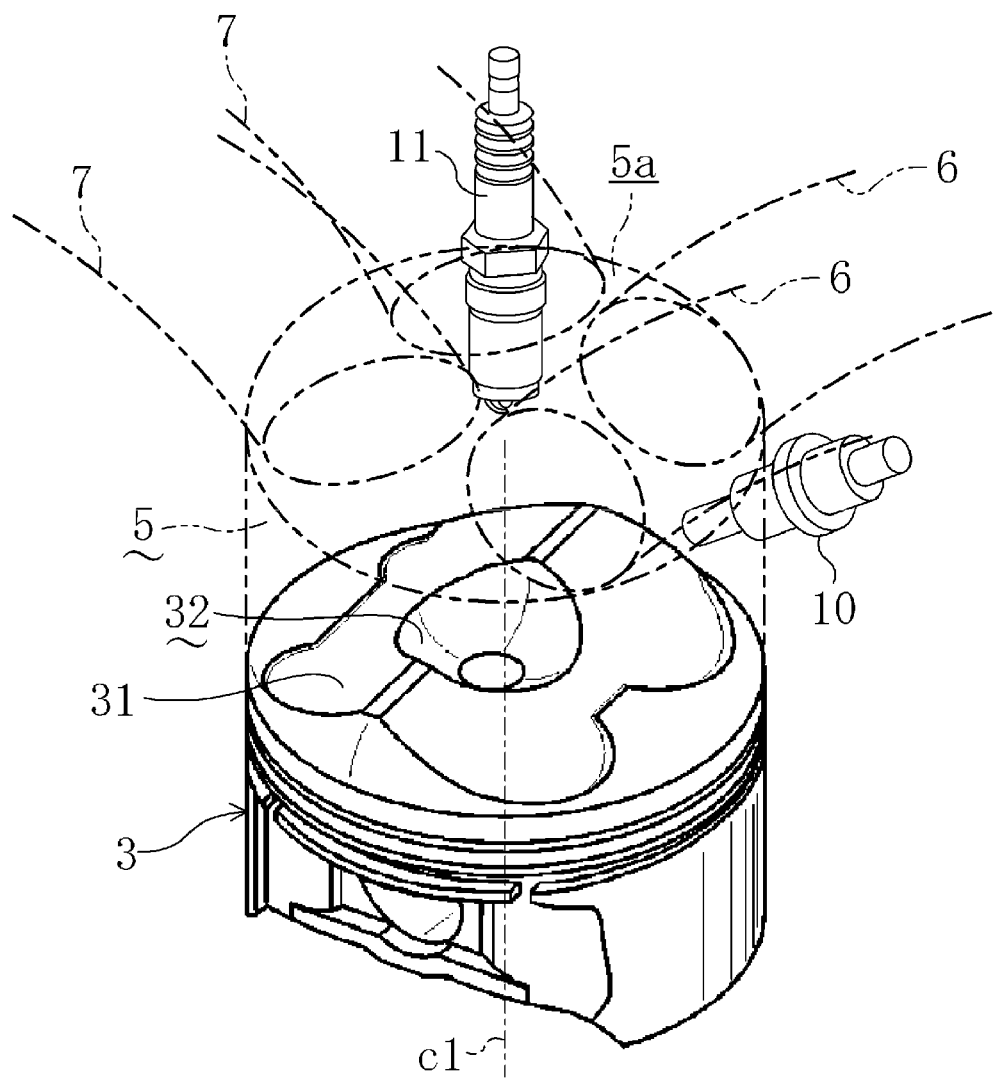
FIG. 2 is a perpendicular view showing a top of a piston and other of a configuration of a combustion chamber in a cylinder of the spark ignition internal combustion engine.

There is shown, in FIG. 1, an engine E (i.e., a spark-ignition type internal combustion engine) according to the present invention. The engine E includes a cylinder block 1 and a cylinder head 2 to be assembled to the upper portion of the cylinder block 1. Also as shown in FIG. 2, a piston 3 is housed inside of a cylinder C in such a manner as to reciprocate along an axis $c_1$ of the cylinder C vertically in FIG. 2. The piston 3 is connected to a crankshaft 4 that is rotatably supported at the lower portion of the cylinder block 1 via a connecting rod. In this manner, the reciprocating motion of the piston 3 is converted into a rotational motion of the crankshaft 4.

As shown in FIGS. 1 and 2, a combustion chamber 5 is formed over the piston 3 inside of the cylinder C. A ceiling $5a$ of the combustion chamber 5 is defined by respective recesses for each cylinder C, formed in the lower surface of the cylinder head 2. In the present preferred embodiment, the combustion chamber 5 is of a so-called pent roof type, and therefore, its ceiling $5a$ is formed into a triangular roof consisting of two inclinations on an intake side and an exhaust side. Two intake ports 6 and 6 and two exhaust ports 7 and 7 are opened at the inclinations, respectively.

As shown only in FIG. 1, an intake valve 8 and an exhaust valve 9 are disposed at an opening of each of the intake ports 6 and an opening of each of the exhaust ports 7, respectively, in such a manner as to be opened or closed by a valve actuating mechanism, not shown, at a predetermined timing.

Under the intake ports 6 and 6 is disposed an injector 10 (i.e., a fuel injection valve) in such a manner that its injection port is exposed to a space defined between the openings so as to inject fuel toward the center from a peripheral edge of the combustion chamber 5. The injector 10 is connected to a fuel supply system having a high pressure fuel pump and the like via a fuel distributing pipe, not shown. Although a direct injection system is presumed in the present preferred embodiment, the present invention may be applied to a port injection system.

Furthermore, in the cylinder head 2, there is provided a spark plug 11 extending along the cylinder axis $c_1$, wherein an electrode disposed at its tip (i.e., its lower end) is exposed to the combustion chamber 5 in the vicinity of the center of the ceiling $5a$. At the base end (i.e., the upper end) of the spark plug 11 is connected an ignition coil unit 12, as shown only in FIG. 1, which is adapted to produce a spark between electrodes at a predetermined timing, so as to ignite an air-fuel mixture staying inside of the combustion chamber 5. The ignition near the center of the combustion chamber 5 in the above-described manner is preferable for excellent flame propagation, as has been well known in the art.

As shown in FIG. 2, at the top of the piston 3 serving as a floor of the combustion chamber 5 is formed a ridge 31 which rises toward the center from both of the intake side and the exhaust side in such a manner as to conform to the shape of the triangular roof of the ceiling $5a$. This formation is useful for adjusting the volume of the combustion chamber 5 and setting a geometric compression ratio of the cylinder C to a high value, and further, is preferable from the viewpoint of the flame propagation since the ratio becomes substantially uniform over the entire combustion chamber 5.

Moreover, at the top of the piston 3 is formed a bowl-shaped cavity 32 near the center in such a manner as to open at the ridge 31. Although a main feature of the present invention will be described in detail later, the cavity 32 is formed in a manner corresponding to a spark point between the electrodes of the spark plug 11 (assumed to be the center between the electrodes, see a point CP in FIG. 3A). Here, the shape and volume of the cavity 32 are appropriately set, thereby enhancing the flame propagation and improving the thermal efficiency of the engine E.

(Constitution of Combustion Chamber)

In the present preferred embodiment, the volume of the combustion chamber 5 is adjusted by forming the ridge 31 at the top of the piston 3, thereby setting the geometric compression ratio of the cylinder C to 13.0 or higher. This aims to enhancing the thermal efficiency and reducing the fuel consumption. The geometric compression ratio is expressed by (V0+V1)/V1, as is well known, wherein V1 represents the volume of the combustion chamber 5 (the total volume inclusive of the volume of the cavity 32) when the piston 3 is located at top dead center (abbreviated as "a TDC") and V0 represents a cylinder displacement (i.e., a stroke volume).

The volume V1 denotes a so-called clearance volume, which is defined by the surfaces of the component parts such as the intake valve 8, the exhaust valve 9, the injector 10, and the spark plug 11 fitted to the cavity of the cylinder head 2 exposed to the combustion chamber 5, the inner circumferential surface of the cylinder C, the top surface of the piston 3 inclusive of the inner surface of the cavity 32, and a clearance defined between the cylinder head 10 and the cylinder block 20 assuming that the intake valve 8 and the exhaust valve 9 are closed when the piston 3 is located at top dead center.

In general, the thermal efficiency is enhanced and the fuel consumption is reduced by setting a compression ratio or an expansion ratio of the cylinder to a high value in the engine. Here, the fuel consumption cannot be enhanced only by setting the geometric compression ratio to a high value. This is because the volume V1 relatively becomes small so that a flame is early liable to interfere with the ceiling or floor (i.e., the top of the piston) of the combustion chamber at the same exhaust amount when the geometric compression ratio is set to a high value, with an attendant disadvantage of degradation of propagation. If the causality between the reduced fuel consumption and the flame propagation is found, the engine can be efficiently designed.

Figure 3:
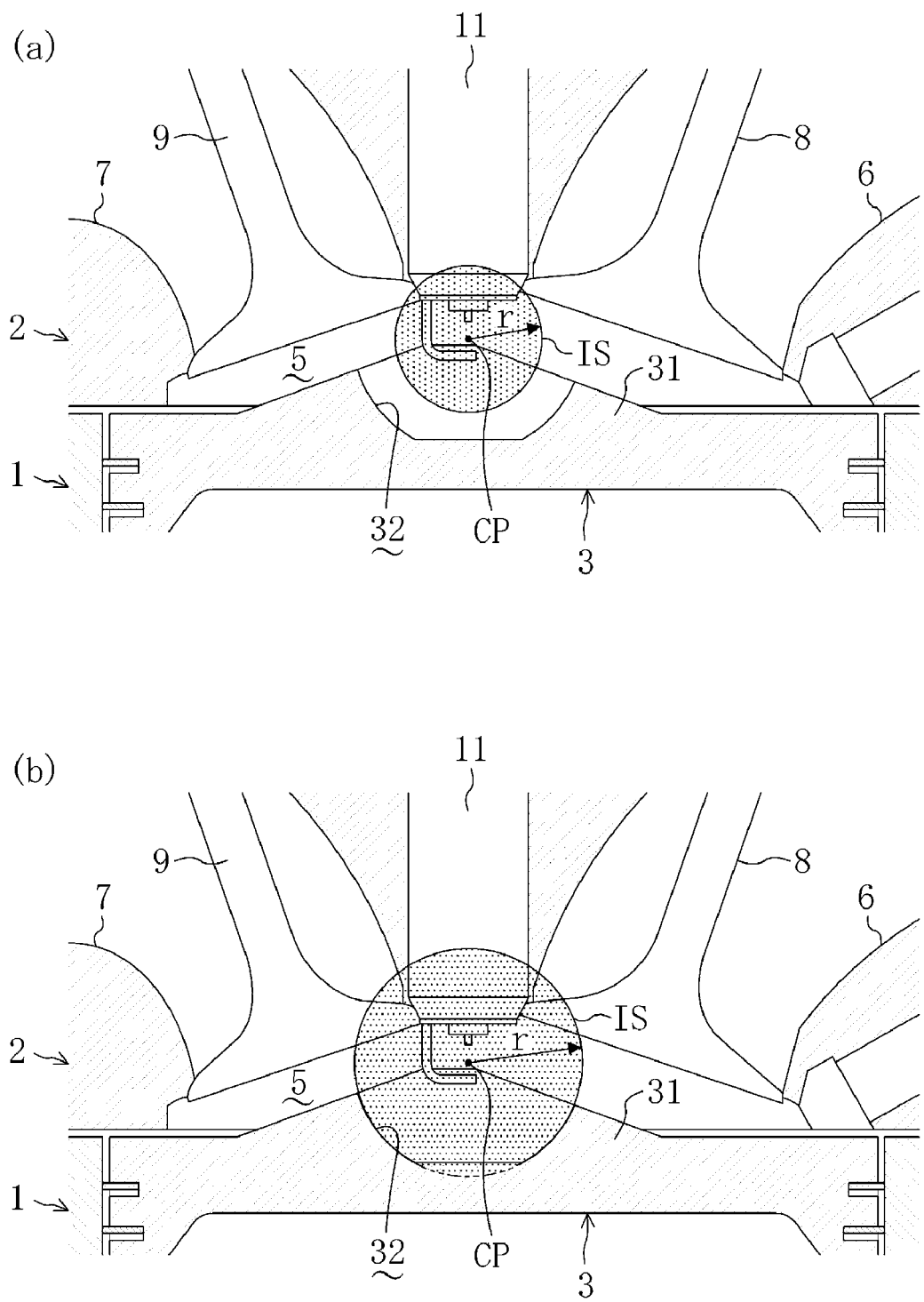
FIG. 3 is an explanatory drawing showing a relationship between a hypothetical sphere IS and a cavity formed on the top of the piston.

According to the present embodiment, first as shown in FIGS. 3A and 3B, a sphere IS having a spark point CP as the center is hypothecated by modeling a flame spreading therearound from the spark point CP of the spark plug 10. Since the flame radially spreads, the hypothetical sphere IS models a range in which the surface of the flame propagates, in which its radius r denotes a propagation degree of the surface of the flame. That is to say, the hypothetical sphere IS when the radius r is relatively small expresses a relatively early timing after the ignition whereas it expresses a relatively late timing when the radius r is relatively large.

When the radius r becomes larger from a state shown in FIG. 3A to a state shown in FIG. 3B, portions interfering with the ceiling 5a of the combustion chamber in the hypothetical sphere IS are increased. In order to quantitatively consider this below, assuming that the volume of a non-interference portion which does not interfere with the ceiling 5a of the combustion chamber or the piston 3 in the hypothetical sphere IS is designated by V2 (unit: $mm^3$) in the case where the piston 3 is located at top dead center, and further, the interference area of an interfering surface at which the hypothetical sphere IS interferes with the ceiling 5a of the combustion chamber or the piston 3 is designated by S (unit: $mm^2$) in this case.

Figure 4:
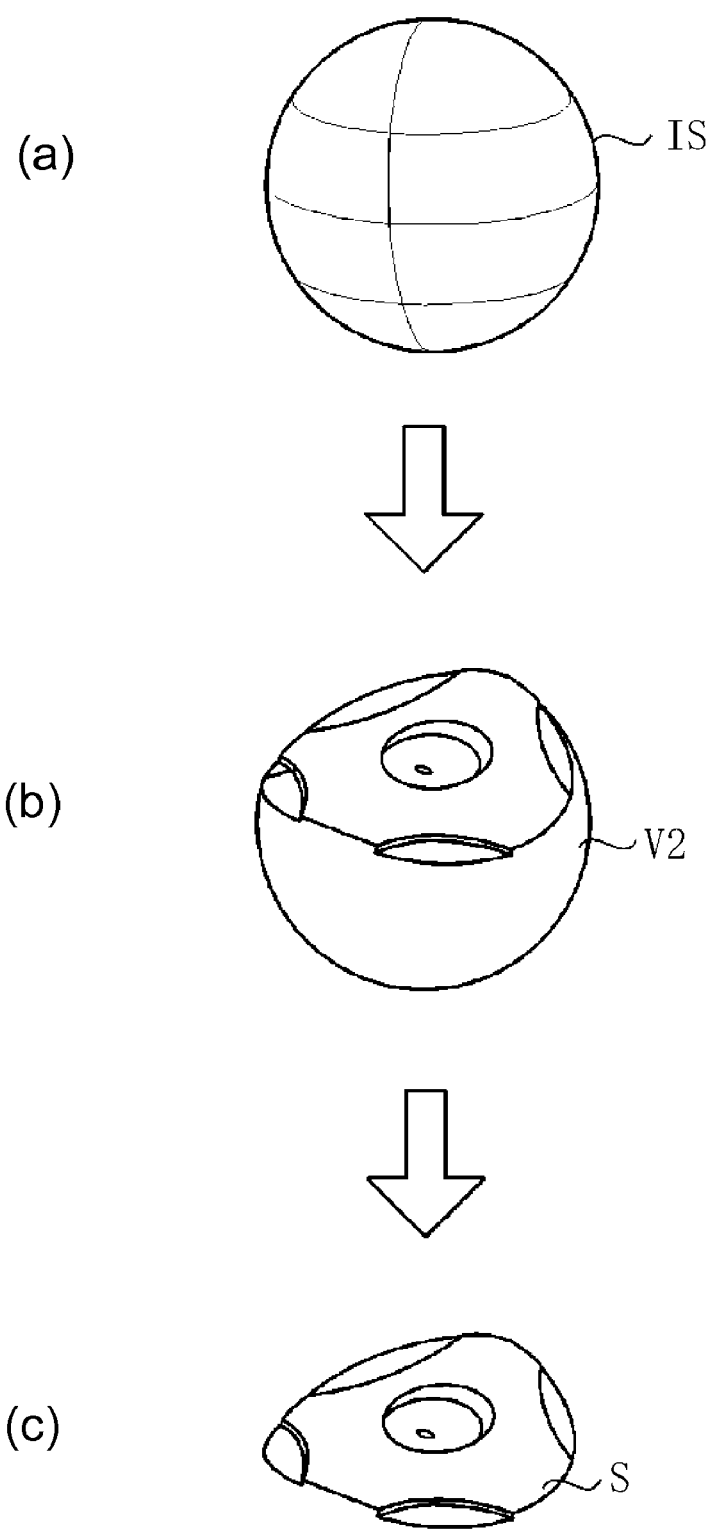
FIG. 4 is an explanatory drawing of a volume of non-interfering part, and an interfering surface area, in the hypothetical sphere.

FIG. 4 illustrates the non-interference volume V2 and the interference area S. FIG. 4 schematically exemplifies (a) the hypothetical sphere IS, (b) the volume V2, and (c) the interference area S in the state of the small radius r in which the hypothetical sphere IS interferes with the ceiling 5a of the combustion chamber 5, that is, the cylinder head 2, the intake valve 8, the exhaust valve 9, and the spark plug 11 whereas does not interfere with the piston 3. The volume V2 is the volume of a three-dimensional object obtained by removing the portion interfering with the ceiling 5a of the combustion chamber 5 or the piston 3 from the hypothetical sphere IS: in contrast, the interference area S denotes the area of the portion interfering with the ceiling 5a or the piston 3.

—First Evaluation Index: Interrelationship Among r, V2, and S—

In the present preferred embodiment, the interrelationship among the radius r, the volume V2, and the area S is used as a first evaluation index to the reduction of the fuel consumption. The fuel consumption is reduced by setting the shape of the combustion chamber 5 such that S/V2=0.12 ($mm^{-1}$) in the case where the radius r is set such that the volume V2 becomes $0.15 \leq V1$. This conclusion results from experiments described below.

Figure 5A:
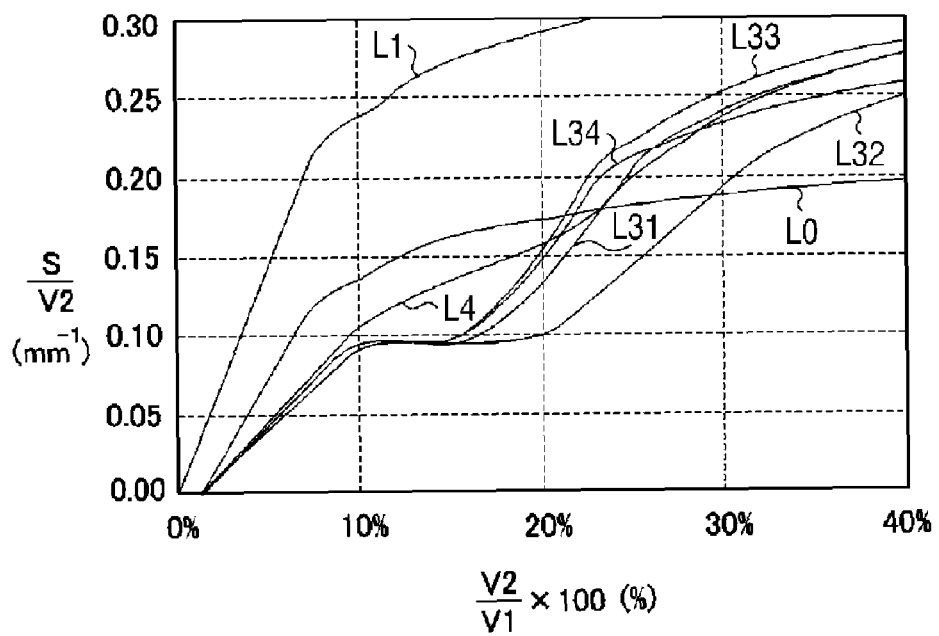
FIGS. 5A and 5B are graphs respectively showing a correlation between S/V2 and V2/V1 and a correlation between S/V2 and fuel consumption improvement rates.

Specifically, in a first experiment described below, a plurality of kinds of pistons having different shapes are made, and then, fuel consumptions are measured under the same condition (at an engine speed of 1500 rpm, an average effective pressure Pe of 262 kPa, an air-fuel ratio A/F of 14.7, and an EGR rate of 20%) by replacing the pistons in a spark-ignition type engine having a bore of 87.5 mm and a stroke of 83.1 mm. FIG. 5A is a graph illustrating calculation results of the volume V2 divided by the volume V1 and the interference area S divided by the volume V2 with respect to some pistons for use in the experiments, wherein the radius r of the hypothetical sphere IS is set to a plurality of values.

The value of the volume V2 divided by the volume V1 is relevant to the radius r. When the value V2/V1 is relatively small, the radius r is relatively small, which shows a relatively initial stage of the flame propagation. In contrast, when the value V2/V1 is relatively large, the radius r is relatively large, which shows a relatively late stage of the flame propagation. The volume V2 of the non-interference portion of the hypothetical sphere IS is an index expressing the size of the flame. The interference area S divided by the volume V2 signifies a rate of the interference area with respect to the size of the flame, which momentarily changes on the assumption that the flame propagates.

Lines L0 and L1, although omitted to be shown, indicate calculation results relating to pistons, each having a substantially flat top surface, wherein L0 indicates a piston having a geometric compression ratio of 11.2 whereas L1 indicates a piston having a geometric compression ratio of 15.0. Upon comparison of the line L1 with the line L0, it is found that the interference with the flame starts at a more relatively early timing of the flame propagation as the height is greater in the case of the flat piston.

Lines L31 to L34 indicate calculation results relating to pistons, each having a bowl-shaped cavity formed at the top thereof, as shown in FIG. 2, wherein the size of the cavity or the shape of the top surface of the piston is varied. Geometric compression ratios fall within a range from 14.0 to 15.0. With these pistons, onset of interference with the flame is delayed by the effect of the formation of the cavity. The value S/V2 is not increased very much within a range of 10% to 20% of the ratio of the volume V2 to the volume V1.

Incidentally, a line L4 indicates a calculation result in the case where the cavity is formed into a rectangular shape in cross section. Also in this case, a geometric compression ratio falls within the range from 14.0 to 15.0. In comparison with the piston indicated by the line L1, a flame occurring by the flame propagation moderately interferes with the inner wall of the combustion chamber. However, in comparison with the pistons indicated by the lines L31 to L34, an influence of the formation of the cavity on the value S/V2 is small. This signifies that the flame interferes with the inner surface of the cavity occurs in the piston indicated by the line L4 earlier than in the pistons indicated by the lines L31 to L34.

The fuel consumptions are measured by using the plurality of kinds of pistons. The results are expressed by the relationship between the improvement ratio of the fuel consumption and the interference area S divided by the volume V2. Within a range of the volume V2 divided by the volume V1 of 0% to 40%, a certain correlation is found between the improvement ratio of the fuel consumption and the interference area S divided by the volume V2 at approximately 15%. Here, as for the improvement ratio of the fuel consumption, any one of the pistons is used as a base model, and then, its fuel consumption is calculated as a reference. In the case where the geometric compression ratio is different from that of the base model, the improvement ratio of the fuel consumption is corrected and calculated according to the geometric compression ratio, and thus, the result is regarded as the improvement rate of the fuel consumption (an estimation value) in the case where the geometric compression ratio is equal.

Figure 5B:
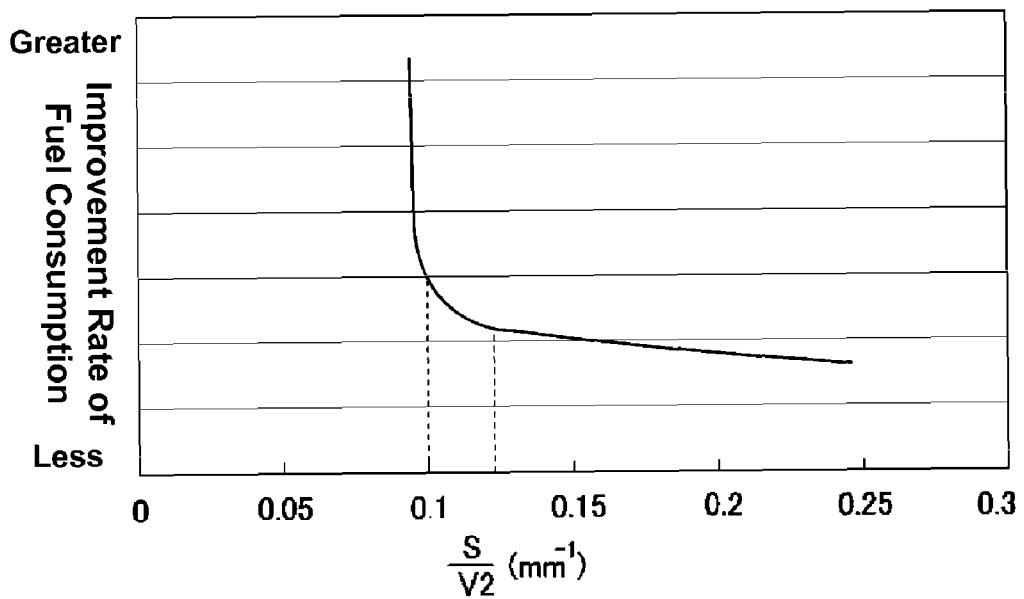

FIG. 5B is a graph illustrating the correlation between the improvement rate of the fuel consumption and the interference area S divided by the volume V2 in the case where the value V2/V1 is 15% when the certain correlation is found, as described above, that is, the radius r of the hypothetical sphere IS is set such that the volume V2 becomes 0.15×V1. From FIG. 5B, as the value becomes smaller in excess of the value S/V2 of about 0.12, the improvement rate of the fuel consumption is rapidly increased, and in particular, is prominent at 0.10 or less. In other words, a so-called point of inflection falls within a range of 0.10 to 0.12 of the value S/V2.

As a consequence, the fuel consumption is reduced by designing the shape of the combustion chamber 5 such that S/V2≦0.12 in the case where the radius r is set such that the volume V2 becomes 0.15×V1. In particular, it is preferable that S/V2≦0.10. Here, in order to reduce the interference area S when the volume V2 is 15% of the volume V1, the above-described bowl-shaped cavity 32 may be formed at the top of the piston 3 in such a manner that the flame cannot interfere with the piston 3 hereto. Mere the formation of the cavity 32 induces an increase in volume of the combustion chamber 5, with an attendant disadvantage in achieving a high compression ratio.

—Second Evaluation Index: V2/V1—

In view of the above, the position, shape, and volume of the cavity 32 are optimized to delay the interference with the flame as possible while paying attention to the increase in volume of the combustion chamber 5, as described above. In order to delay the interference with the flame, a spherical cavity in contact with the hypothetical sphere IS may be formed at the top of the piston 3. It may be difficult to form even the bottom of the cavity into a spherical shape from the viewpoint of durability and the like of the piston 3, and therefore, a part of the inner surface of the cavity 32 is formed into a spherical shape in contact with the hypothetical sphere IS.

In addition, if the radius r is set such that the hypothetical sphere IS is brought into contact with a part of the spherical surface of the cavity 32, the volume V2 of the non-interference portion of the hypothetical sphere IS is schematically regarded as the volume of the cavity 32, and thus, a ratio V2/V1 of the volume V2 to the volume V1 of the combustion chamber is used as a second evaluation index in order to reduce the fuel consumption in this embodiment. As the volume V2 divided by the volume V1, that is, the ratio of the cavity to the volume of the combustion chamber becomes larger, the interference of the flame with the piston can be delayed, thus enhancing the flame propagation.

The inventor of the present application conducted experiments by variously changing the shape of the ridge 31 or the cavity 32 of the piston 3 in such a manner as to vary the value of the volume V2 divided by the volume V1, and then, studied fuel consumption rates or combustion durations in the engine E, thus finding that the fuel consumption rate can be effectively reduced by allowing the value of the volume V2 divided by the volume V1 within a predetermined range (for example, 0.31≦V2/V1≦0.37). This will be described below.

Figure 6A:
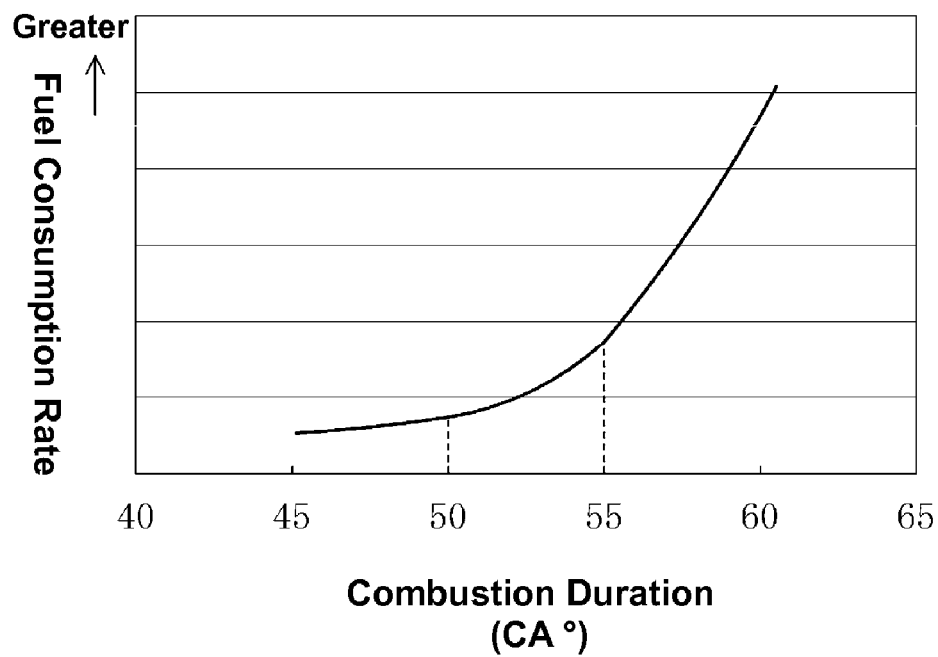
FIGS. 6A and 6B are graphs respectively showing a correlation between combustion duration and fuel consumption rate, and a correlation between volume ratio of the cavity to the combustion chamber, and combustion duration.

Specifically, like in the first experiment, in a second experiment described below, a plurality of kinds of pistons are prepared in a spark-ignition type engine having a bore of 87.5 mm and a stroke of 83.1 mm, and further, a plurality of kinds of pistons are prepared also in engines of a plurality of specifications such as cylinder bores of 83.0 mm, 72.0 mm and the like, and thereafter, fuel consumptions and combustion rates are measured under the same operational condition (at an engine speed of 1500 rpm, an average effective pressure Pe of 262 kPa, an air-fuel ratio A/F of 14.7, and an EGR rate of 20%). FIG. 6A is a graph illustrating experiment results expressed by the relationship between the fuel consumption rates and the combustion durations. From FIG. 6A, it is found that there is certain correlation between the fuel consumption rate and the combustion duration irrespective of a ratio of a bore to a stroke or the size of the piston.

From FIG. 6A, when the combustion duration is varied according to the variation of the shape of the cavity formed at the piston, the fuel consumption ratio is rapidly increased as the combustion duration becomes longer at a crank angle of about 52°, and in particular, this trend becomes prominent in excess of 52° CA. In other words, a so-called point of inflection falls within a range of 52° CA to 55° CA of the combustion duration. The fuel consumption rate can be effectively reduced in a shorter combustion duration.

Figure 6B:
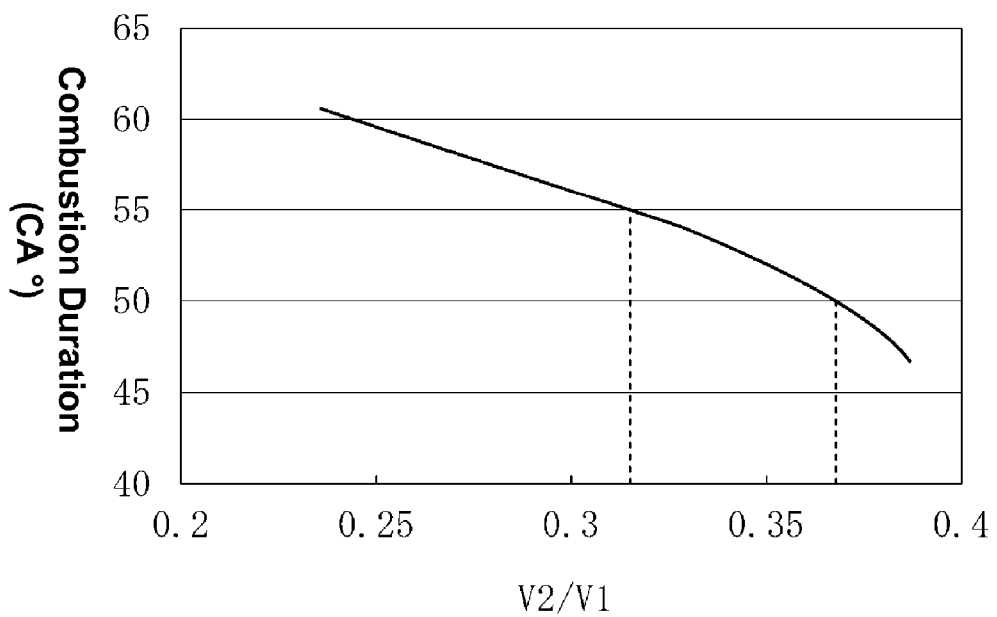

In contrast, as illustrated in FIG. 6B, a simple relationship in which the larger the value V2/V1, the shorter the combustion duration is established between the volume V2 divided by the volume V1 and the combustion duration. This is because the interference of the piston 3 with the flame becomes delayed with an increase in volume of the cavity 32, thereby enhancing the flame propagation. The combustion duration becomes 55° CA when the value V2/V1 exceeds about 0.31, and therefore, when combining it with the results in FIG. 6A, it can be said that the volume V2 divided by the volume V1 is set to 0.31 or more in order to reduce the fuel consumption ratio.

Here, as is found from the graph of FIG. 6A, even if the combustion duration becomes smaller than 50° CA to 52° CA, a decrease degree of the fuel consumption rate accordingly becomes rapidly small. As the volume of the cavity 32 is increased to reduce the combustion duration, the volume of the combustion chamber 5 becomes larger. In consideration of a disadvantage in achieving a high compression ratio, the value of the volume V2 divided by the volume V1 cannot be set to a very large value. From the graph, it is preferable to set such that V2/V1≦0.37.

As described above, in the engine E in the present preferred embodiment, at least a part of the inner surface of the cavity 32 formed at the top of the piston 3 is formed into the spherical shape in contact with the hypothetical sphere IS having the spark point CP of the spark plug 11 as the center when the piston 3 is located at top dead center, and further, the ratio V2/V1 of the volume V2 to the volume V1 of the combustion chamber at the non-interference portion of the hypothetical sphere IS falls within the predetermined range (i.e., from 0.31 to 0.37). With this design, the interference between the piston 3 and the flame is delayed to the maximum while achieving the compression ratio as high as 13 or more, thus satisfactorily enhancing the flame propagation. As a consequence, the engine efficiency can be enhanced, and therefore, the fuel consumption can be reduced.

Additionally, the so-called direct injection system for directly injecting the fuel from the injector 10 exposed to the combustion chamber 5 is adopted in the engine E in this embodiment. Intake air is cooled by heat of vaporization of the fuel injected in the above-described manner, thereby suppressing abnormal combustion due to self ignition or the like of the air-fuel mixture, with an advantage in setting the compression ratio of the cylinder C to a high value.

In addition, the injector 10 is arranged in such a manner as to inject the fuel toward the center from the peripheral edge of the combustion chamber 5. The fuel injected from the first half through the midway of an intake stroke by the cylinder C is supplemented at the cavity 32 of the piston 3, thereby expecting an effect of suppression of adhesion to the inner circumferential surface of the cylinder C.

Incidentally, the above-described first and second experiments were conducted in the engine in which a stroke volume of a single chamber of the cylinder C (a single chamber volume), that is, the exhaust amount V0 was 0.3 liter or more, and further, the geometric compression ratio ranged from 14.0 to 15.0. The above-described correlation is found in an engine E having a geometric compression ratio of 14.0 or higher or 14.5 or higher. Consequently, the present invention is effective in reducing the fuel consumption in the engine having such a high compression ratio.

In this point, the lower the geometric compression ratio, the relatively larger the volume of the combustion chamber 5, thereby making the flame propagation excellent. Therefore, the above-described correlation is established also in an engine having a compression ratio of lower than 14.0. However, in consideration of tradeoffs between the high compression ratio and the improvement in thermal efficiency, the present invention is effective at least in reducing the fuel consumption in the engine having a geometric compression ratio of 13.0 or higher.

(Design Procedures)

Figure 7:
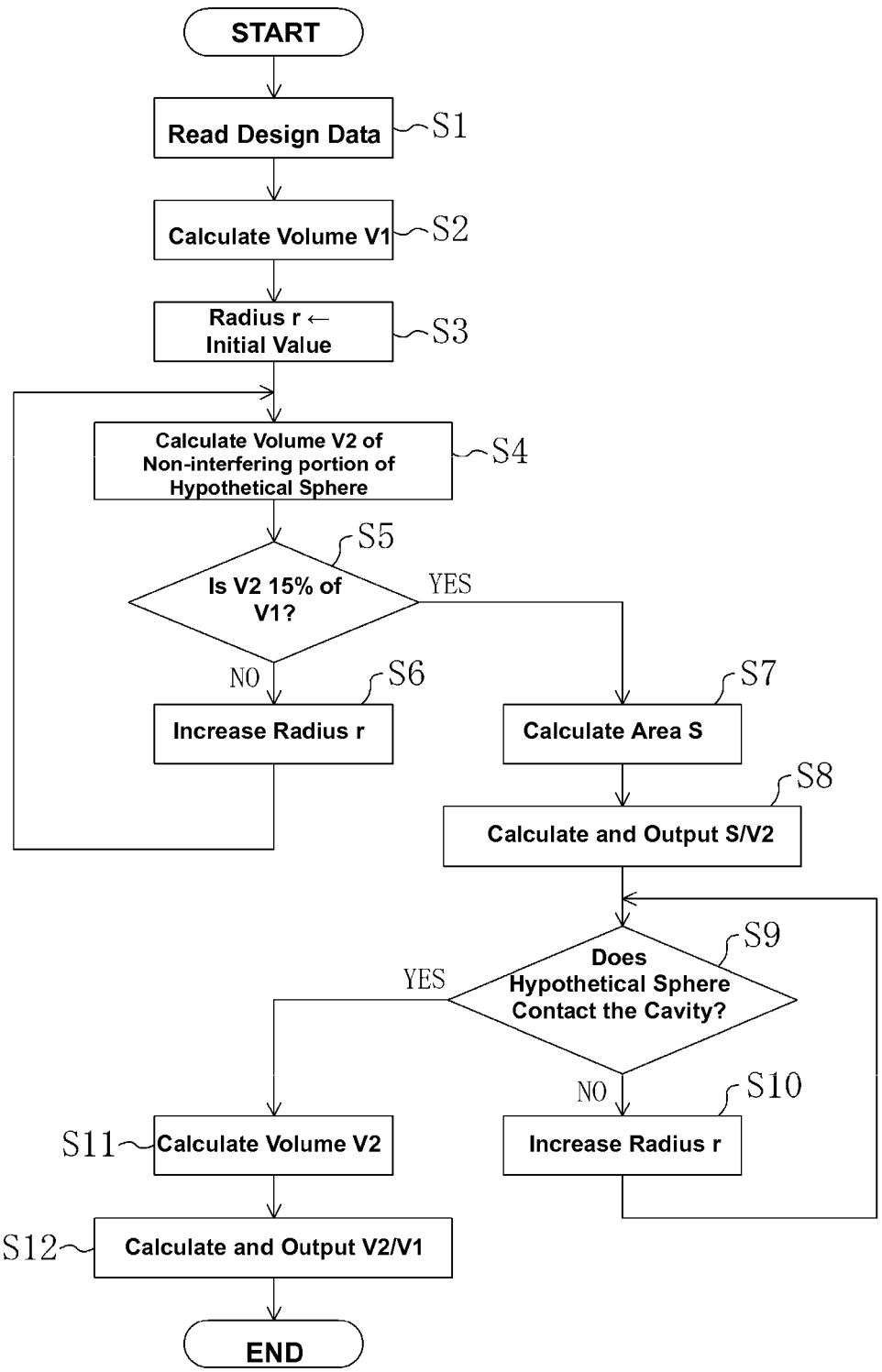
FIG. 7 is a flowchart showing an example of processing routines executed when designing an engine on a computer based on evaluation indexes according to the embodiment.

Next, procedures will be exemplified below in the case where the engine is designed on a computer based on the first and second evaluation indexes. FIG. 7 is a flowchart illustrating an example of processing to be executed by the computer in the case where the first and second evaluation indexes are used in reducing the fuel combustion.

As illustrated, in step S1 after the start, design data on the engine component parts defining the combustion chamber 5 is read in. Each of the component parts is defined by a three-dimensional solid model. In step S2, the volume V1 is calculated based on the design data read in step S1. In step S3, an initial value is set as the radius r of the hypothetical sphere IS. The initial value may be previously determined on a program or may be set by a user.

Subsequently, in step S4, the volume of the hypothetical sphere IS is calculated based on the radius r set in step S3, and then, the interference portion between the hypothetical sphere IS and the ceiling 5a or the floor (i.e., the top of the piston 3) of the combustion chamber 5 is calculated based on the calculated volume, so that the volume of the interference portion is calculated. The volume of the interference portion is subtracted from the volume of the hypothetical sphere IS, and thus, the volume V2 of the non-interference portion is calculated.

In step S5, it is determined whether or not the volume V2 calculated in step S4 is 15% of the volume V1 calculated in step S2. If the result is affirmative, the routine proceeds to step S7, described later: in contrast, if the result is negative, the routine proceeds to step S6, in which the radius r is increased by, for example, a specified value. The routine returns to step S4, and then, the processing is repeated until the volume V2 becomes 15% of the volume V1 in step S5.

When the volume V2 becomes 15% of the volume V1, the routine proceeds to step S7, in which the area S at this time, that is, at the time when V2=0.15×V1, is calculated. In step S8, the value S/V2 is calculated, and then, the calculation result is output. A designer can determine whether to change or accept the design of the component part of the combustion chamber based on the first evaluation index from the output calculation result. For example, if the value S/V2 exceeds 0.12 ($mm^{-1}$), the component part will be re-designed.

In the meantime, the routine proceeds to step S9, in which it is determined whether or not the hypothetical sphere IS calculated in step S4 is brought into contact with the cavity 32 of the piston 3 (i.e., the hypothetical sphere IS calculated in step S4 is brought into contact with a spherical portion of the inner surface of the cavity 32). If the result is affirmative, the routine proceeds to step S11: in contrast, if the result is negative, the routine proceeds to step S10, in which the radius r is increased in the same manner as in step S6. The routine returns to step S9, and then, the processing is repeated until the hypothetical sphere IS is brought into contact with the cavity 32 of the piston 3.

When the hypothetical sphere IS is brought into contact with the cavity 32 of the piston 3, the routine proceeds to step S11, in which the volume V2 of the non-interference portion of the hypothetical sphere IS is calculated in the same manner as in step S4. In next step S12, the value V2/V1 is calculated, and then, the calculation result is output. The designer can determine whether to change or accept the design of the component part of the combustion chamber based on the second evaluation index from the output calculation result. For example, if the value V2/V1 is lower than 0.31 or exceeds 0.37, the component part will be re-designed.

Here, upon receipt of the outputs in steps S8 and S12, although the component part to be re-designed by the designer may be any of the engine component parts constituting the combustion chamber 5, the piston 3 is simple and easy from the viewpoint of design freedom with respect to the first evaluation index, whereas the shape of the top of the piston 3 is inevitably re-designed with respect to the second evaluation index.

As a consequence, with the design method (i.e., the fabrication method) for the spark-ignition type engine E in the present preferred embodiment, the processing illustrated in the flowchart of FIG. 7 is performed on the computer, so that the reduction of the fuel consumption can be expected to some extent without repeating procedures of sample production, actual engine test, and re-design by the designer, thereby achieving the efficient design.

Moreover, the values of the characteristics of the combustion chamber 5 such designed as described above are applicable to the engine E having the various specifications different in exhaust amount, bore/stroke ratio, size of the piston 3, or the like, as described above. This is because the first and second evaluation indexes are satisfied, so that the combustion state inside of the cylinder C, mainly, a heat generation pattern becomes substantially uniform, and therefore, the flame propagation is enhanced while achieving the high compression ratio, thus producing the function and effect of reducing the fuel consumption independently of the specifications of the engine E. Thus, the advantageous result of development is achieved in the plurality of engines E having the different specifications, thus fabricating the engines E of the plurality of specifications having the different exhaust amounts with small development investment.

Incidentally, the spark-ignition type engine E according to the present invention is not limited to the engine E having the four valves in the above-described preferred embodiment, but may be applied to a 3-valve engine having one exhaust port per cylinder C.

Although not especially referred to in the above-described preferred embodiment, it is preferable that the stroke should be longer than the bore in the cylinder C. The larger the bore of the cylinder C is, the flatter the shape of the combustion chamber 5 is. This is liable to lead to disadvantage for the flame propagation. Therefore, the stroke should be preferably longer in order to achieve as high the compression ratio as 13 or higher.

Additionally, although the 4-cycle multi-cylinder gasoline engine E is exemplified in the above-described preferred embodiment, the present invention may be applicable to other types of spark-ignition internal combustion engines.

Moreover, although the engine is designed based on the first and second evaluation indexes in the above-described preferred embodiment, the present invention is not limited to this. For example, the engine may be designed only based on the second evaluation index. Additionally, the second evaluation index is not limited to the above-described index (V2/V1=0.31 to 0.37). For example, an upper limit of V2/V1 may fall within the range of an appropriate value of 1.2 times or lower of a lower limit. In this manner, the combustion states of the engines of the different specifications can become uniform. Here, the advantageous result of the development in the engine of any one of the specifications can be achieved in an engine of another specification.

In the above embodiment, the ridge 31 is formed conforming to the shape of the ceiling of the combustion chamber 5. It reduces a total volume of the combustion chamber 5 and increases a geometric compression ratio while forming the cavity 32 on the top of the piston 3.

Further, the spark plug 11 is arranged approximately at a center of the ceiling of the combustion chamber 5. It improves the flame propagation property as is known. Corresponding to this spark plug arrangement, the cavity 32 is preferably arranged approximately at a center of the top of the piston 3.

Further, the fuel injector 10 is arranged to inject fuel directly into the combustion chamber 5. It makes it possible to set the compression ratio to a higher value to the extent that abnormal combustions such as a self-ignition of the air-fuel mixture is prevented since the heat of vaporization of the injected fuel cools down the intake air.

In addition, the injector 10 is arranged in such a manner as to inject the fuel toward the center from the peripheral edge of the combustion chamber 5. The fuel injected from the first half through the midway of an intake stroke by the cylinder C is supplemented at the cavity 32 of the piston 3, thereby expecting an effect of suppression of adhesion to the inner circumferential surface of the cylinder C.

Further, a stroke of the piston 3 in the cylinder C is preferably longer than a bore size of the cylinder C. It is for suppressing a tendency that the more flattened a cross sectional shape of combustion chamber 5 along a cylinder axis is the greater the bore size is from being excessively flattened, leading to a disadvantage for the flame propagation. This longer stroke configuration prevents the combustion chamber shape from being excessively flattened even when the combustion chamber is made smaller for a higher compression ratio.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A spark ignited internal combustion engine, comprising:
 a combustion chamber having a side wall formed by a cylinder, a floor formed by a top surface of a piston, and a ceiling, and having a cylinder stroke volume of 0.3 liter or greater;
 a spark plug arranged on said ceiling and having its spark point located in said combustion chamber; and
 a cavity formed on said top surface of said piston, at least part of the cavity defining a spherical surface to which a hypothetical sphere having its center at said spark point contacts when said piston is at top dead center during a cylinder cycle, and said cavity being formed so that a ratio of V2 to V1 is equal to or greater than 0.31 and equal to or less than 0.37, where V1 is a volume of said combustion chamber when said piston is at top dead center, and V2 is a volume of part of said hypothetical sphere which does not interfere with any one of said floor and ceiling of said combustion chamber when said piston is at top dead center;
 wherein the engine has a geometric compression ratio of 13.0 or greater.

2. The spark ignited internal combustion engine as described in claim 1, further comprising on said top surface of said piston a ridge which is shaped to approximately conform to the shape of said ceiling of said combustion chamber, and wherein said cavity is formed in said ridge.

3. The spark ignited internal combustion engine as described in claim 2, wherein said spark plug is arranged approximately at a center of said ceiling of said combustion chamber, and wherein said cavity is arranged approximately at the center of said top surface of said piston.

4. The spark ignited internal combustion engine as described in claim 3, further comprising a fuel injector which is configured to directly inject fuel into said combustion chamber.

5. The spark ignited internal combustion engine as described in claim 4, wherein said fuel injector is arranged to inject fuel from the periphery toward the center part of said internal combustion engine.

6. The spark ignited internal combustion engine as described in claim 5, wherein a stroke of said piston is greater than a bore of said cylinder.

7. The spark ignited internal combustion engine as described in claim 1, further wherein said spark plug is arranged approximately at a center of said ceiling of said combustion chamber, and wherein said cavity is arranged approximately at a center of said top surface of said piston.

8. The spark ignited internal combustion engine as described in claim 7, further comprising a fuel injector which is configured to directly inject fuel into said combustion chamber.

9. The spark ignited internal combustion engine as described in claim 8, wherein said fuel injector is arranged to inject fuel from the periphery toward the center part of said internal combustion engine.

10. The spark ignited internal combustion engine as described in claim 9, wherein a stroke of said piston is greater than a bore of said cylinder.

11. The spark ignited internal combustion engine as described in claim 1, further comprising a fuel injector which is configured to directly inject fuel into said combustion chamber and arranged to inject fuel from the periphery toward the center part of said internal combustion engine.

12. The spark ignited internal combustion engine as described in claim 11, wherein a stroke of said piston is greater than a bore of said cylinder.

13. The spark ignited internal combustion engine as described in claim 1, wherein a stroke of said piston is greater than a bore of said cylinder.

14. A method of manufacturing spark ignited internal combustion engines having different single cylinder stroke volumes of 0.3 liters or greater and geometric compression ratios of 13.0 or greater, said spark ignited internal combustion engines comprising a combustion chamber having a side wall formed by a cylinder, a floor formed by a top surface of a piston and a ceiling, a spark plug arranged on said ceiling and having its spark point located in said combustion chamber, and a cavity formed on said top surface of said piston, at least part of a surface of the cavity defining a spherical surface to which a hypothetical sphere having its center at said spark point contacts when said piston is at top dead center during a cylinder cycle, the method comprising:
  forming said cavity for pistons in each of the spark ignited internal combustion engines having different single cylinder stroke volumes so that respective ratios of V2 to V1 for pistons within each of the spark ignited internal combustion engines fall within a common range for all of said spark ignited internal combustion engines, where V1 is a volume of said combustion chamber when said piston is at top dead center and V2 is a volume of part of said hypothetical sphere which does not interfere with any one of said floor and said ceiling of said combustion chamber when said piston is at top dead center, said common range for the ratios of V2 to V1 being equal to or less than 0.37.

15. The method as described in claim 14, wherein said common range of ratios of V2 to V1 is equal to or greater than 0.31.

16. The spark ignited internal combustion engine as described in claim 1, wherein said combustion chamber is configured to satisfy a condition of $S/V2 \leqq 0.12$ (mm$^{-1}$) when a radius r of a hypothetical sphere with its center at a spark point of said spark plug is set to satisfy a condition of $V2=0.15 \times V1$, where: S (mm$^2$) is an area of an interference surface between said hypothetical sphere and an inner wall of said combustion chamber in a state when said piston is at its top dead center position; and V2 is expressed in cubic millimeters (mm$^3$).

17. The method as described in claim 14, wherein said combustion chamber is configured to satisfy a condition of $S/V2 \leqq 0.12$ (mm$^{-1}$) when a radius r of a hypothetical sphere with its center at a spark point of said spark plug is set to satisfy a condition of $V2=0.15 \times V1$, where: S (mm$^2$) is an area of an interference surface between said hypothetical sphere and an inner wall of said combustion chamber in a state when said piston is at its top dead center position; and V2 is expressed in cubic millimeters (mm$^3$).

18. The method as described in claim 14, wherein an upper limit of said common range of ratios of V2 to V1 is equal to or less than a value of 1.2 times of a lower limit of said common range of ratios of V2 to V1.

19. A method of manufacturing spark ignited internal combustion engines having different single cylinder stroke volumes of 0.3 liters or greater and geometric compression ratios of 13.0 or greater, said spark ignited internal combustion engines comprising a combustion chamber having a side wall formed by a cylinder, a floor formed by a top surface of a piston and a ceiling, a spark plug arranged on said ceiling and having its spark point located in said combustion chamber, and a cavity formed on said top surface of said piston, at least part of a surface of the cavity defining a spherical surface to which a hypothetical sphere having its center at said spark point contacts when said piston is at top dead center during a cylinder cycle, the method comprising: forming said cavity so that ratios of V2 to V1 fall within a common range for said spark ignited internal combustion engines, where V1 is a volume of said combustion chamber when said piston is at top dead center and V2 is a volume of part of said hypothetical sphere which does not interfere with any one of said floor and said ceiling of said combustion chamber when said piston is at top dead center, an upper limit of said common range of ratios of V2 to V1 being equal to or less than a value of 1.2 times of a lower limit of said common range of ratios of V2 to V1.

20. A spark ignited internal combustion engine having a geometric compression ratio of 13.0 or greater, comprising: a combustion chamber having a side wall formed by a cylinder, a floor formed by a top surface of a piston, and a ceiling, and having a cylinder stroke volume of 0.3 liter or greater; a spark plug arranged on said ceiling and having its spark point located in said combustion chamber; and a cavity formed on said top surface of said piston, at least part of the cavity defining a spherical surface to which a hypothetical sphere having its center at said spark point contacts when said piston is at top dead center during a cylinder cycle, and said cavity being formed so that a ratio of V2 to V1 is equal to or less than 0.37, where V1 is a volume of said combustion chamber when said piston is at top dead center, and V2 is a volume of part of said hypothetical sphere which does not interfere with any one of said floor and ceiling of said combustion chamber when said piston is at top dead center.

21. The spark ignited internal combustion engine as described in claim 20, wherein said combustion chamber is configured to satisfy a condition of $S/V2 \leqq 0.12$ (mm$^{-1}$) when a radius r of a hypothetical sphere with its center at a spark point of said spark plug is set to satisfy a condition of $V2=0.15 \times V1$, where: S (mm$^2$) is an area of an interference surface between said hypothetical sphere and an inner wall of said combustion chamber in a state when said piston is at its top dead center position; and V2 is expressed in cubic millimeters (mm$^3$).

* * * * *